(No Model.)
C. H. PETERS.
BELL CORD COUPLING.
No. 369,123. Patented Aug. 30, 1887.
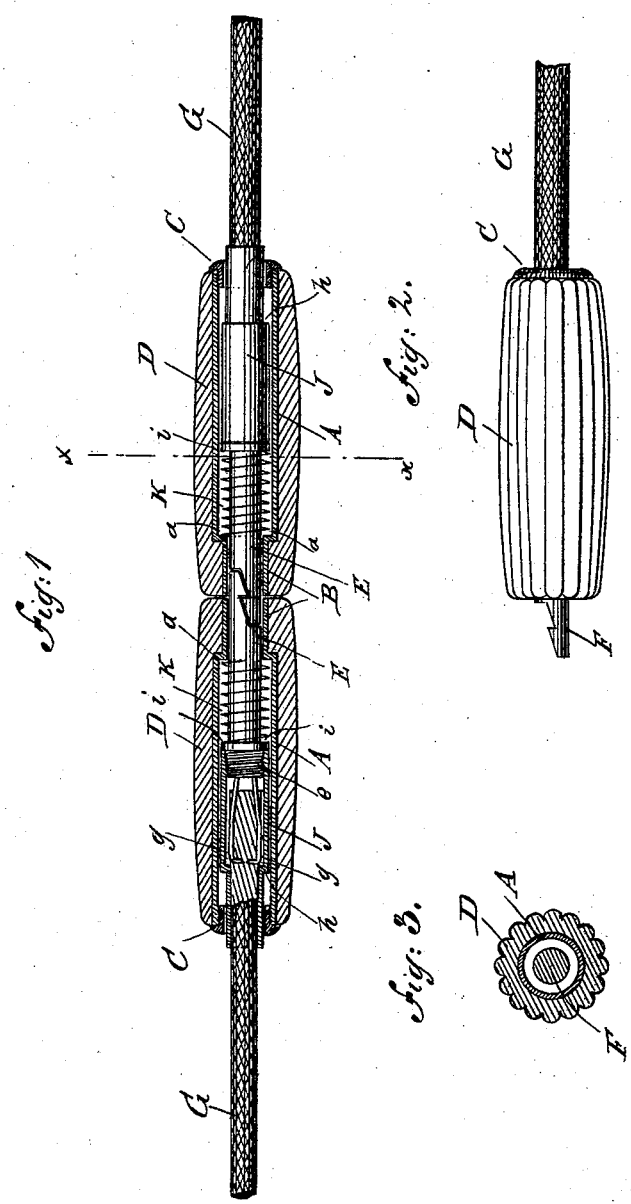
WITNESSES:
INVENTOR:
C. H. Peters
BY Munn & Co
ATTORNEYS.

UNITED STATES PATENT OFFICE.

CHRISTIAN HENRY PETERS, OF DANVILLE, ILLINOIS.

BELL-CORD COUPLING.

SPECIFICATION forming part of Letters Patent No. 369,123, dated August 30, 1887.

Application filed June 1, 1887. Serial No. 239,947. (No model.)

*To all whom it may concern:*

Be it known that I, CHRISTIAN HENRY PETERS, of Danville, in the county of Vermilion and State of Illinois, have invented a new and Improved Bell-Cord Coupling, of which the following is a full, clear, and exact description.

My invention relates to couplings for the bell-cord of railway-coaches, and has for its object to provide a coupling that is easy of adjustment and which when coupled will not part or become disengaged.

A further object of the invention is to provide against the breakage of the glass in the end doors and windows by careless uncoupling, and also the breaking of the lamp-shades, &c., when the cord is violently pulled through the cord-hangers in the interior of the coach.

The invention consists of the combination and arrangement of parts, all as hereinafter fully described, and set forth in the claims.

Reference is to be had to the accompanying drawings, forming a part of this specification, in which similar letters of reference indicate corresponding parts in all the figures.

Figure 1 is a longitudinal sectional view of the coupling at the meeting ends of the bell-cord. Fig. 2 is a front elevation of one of the couplers, and Fig. 3 is a cross-section of the same.

In the drawings, A represents a tube or casing within which the coupling-hooks on the meeting ends of the bell-cord work. The casing A has a reduced portion, B, which forms an annular shoulder, $a$, in the casing. The casing A is internally screw-threaded at its outer end to receive the retaining-cap C. Said casing A, which is preferably made of metal, is covered by a jacket of soft rubber, D. The jacket D is made to fit snugly around the casing A, so that it cannot be stripped from or rolled on said casing.

The coupling-hooks E are threaded at the inner end, as $e$, and have the projecting fingers $g$, which bite into the ends of the bell-cord. A sleeve, J, having one end internally threaded, is then passed over the end of the cord G and fingers $g$ and screwed onto the threaded end $e$ of the coupling-hook. It will thus be seen that the coupling-hooks are securely fastened to the ends of the bell-cord. The sleeve J has a reduced portion forming a shoulder, $h$, which prevents the coupling-hook being withdrawn from the casing A, as said shoulder will bear against the retaining-cap C on the casing A.

A spiral spring, K, around the hook E has a seat on the annular flange $i$ of the hook E, and also against the internal shoulder, $a$, of the casing A. The spring K, working within the casing A, acts to hold the coupling-hook E within the casing when the connection is broken or when the coupling-hooks are disengaged. The spring also serves to tighten the coupling-joint and prevent the hook E from becoming disengaged.

In order to uncouple the joint and break the connection, the jackets D, with the casings A, are forced apart, exposing the hooked joint and allowing the hook E to be disconnected.

From the foregoing it will readily be seen that the coupling and uncoupling of the bell-cord can be easily and quickly accomplished, also that the coupling will be lasting and secure, making it impossible for the connection to be broken under the natural strain which the bell-cord is subjected to.

In case a train-hand in uncoupling the cord should drop an end, the destruction of the glass in the end doors would be prevented by the jacket D. It also prevents the destruction of lamps and other glass fixtures within the coach when the bell-cord is violently drawn through the hangers.

Having thus described my invention, what I claim as new, and desire to secure by Letters Patent, is—

1. A bell-cord coupling consisting of a coupling-hook on the end of the bell-cord, a casing surrounding the hook and held thereon, and a spring surrounding the hook within the casing, substantially as shown and described.

2. A bell-cord coupling consisting of a coupling-hook on the end of a bell-cord, a casing surrounding the hook and held thereon, a spring surrounding the hook, and a jacket of soft metal on the casing, substantially as herein shown and described.

3. The combination, with the casing A, having the shoulder $a$, of a coupling-hook, E, on the end of the bell-cord, sleeve J, and spring K, substantially as herein shown and described.

4. The combination of the casing A, provided with the retaining cap C, the coupling-hook E, fingers for securing the coupling-hook to the bell-cord, and the sleeve J, provided with the shoulder $h$, substantially as herein shown and described.

5. The combination, with the casing A, of the coupling-hook E, having the fingers $g$ for grasping and penetrating the ends of the bell-cord, substantially as herein shown and described.

6. The combination, with the casing A, of the coupling-hook E, having the threaded end $e$ and the grasping-fingers $g$, and the sleeve J, substantially as shown and described.

7. The combination, with the casing A, having the shoulder $a$, of the coupling-hook E, having the shoulder $i$, and the fingers $g$ for grasping the end of the bell-cord, and the spring K, substantially as herein shown and described.

8. The combination, with the casing A, having the shoulder $a$, of the coupling-hook E, secured to the end of the bell-cord, the sleeve J, the cap C, and the spring K, substantially as herein shown and described.

CHRISTIAN HENRY PETERS.

Witnesses:
WM. GRABS,
MICHAEL WEBER.